Oct. 26, 1971 H. E. BRAGG 3,615,161
XENON ARC PICTURE PROJECTION
Filed Sept. 18, 1968
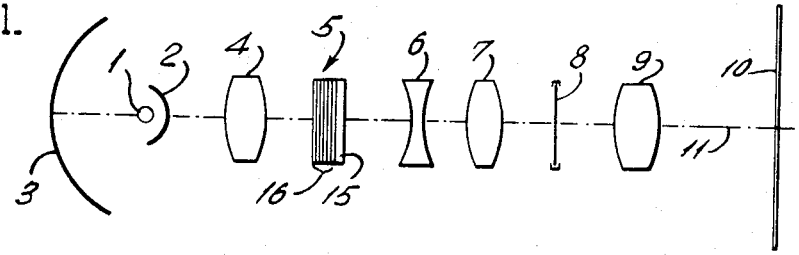
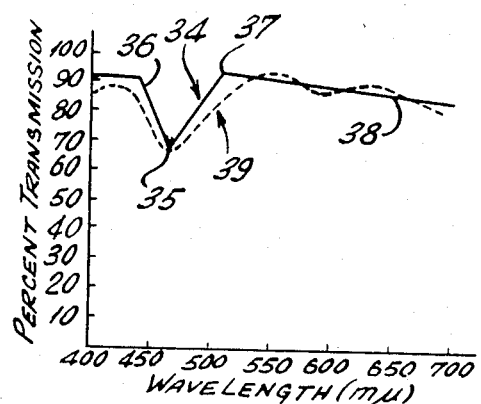
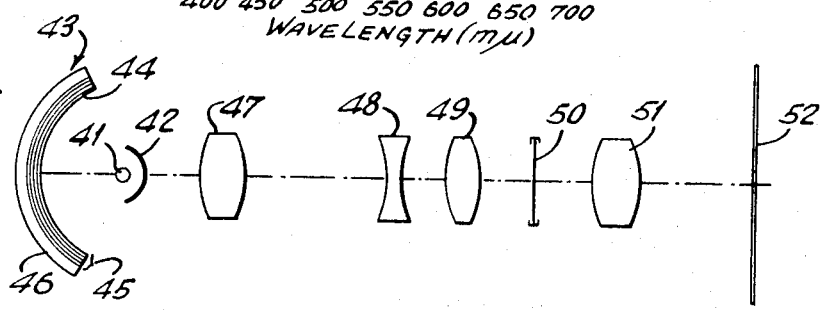
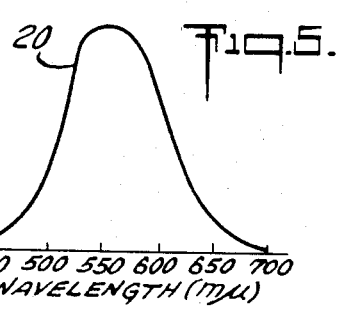
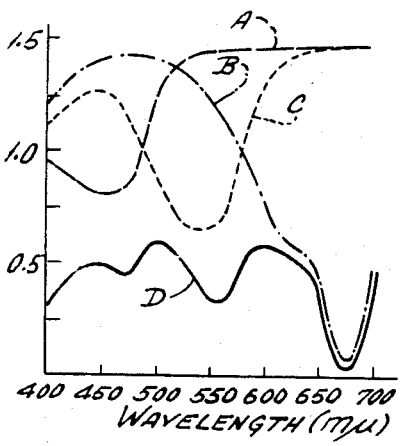
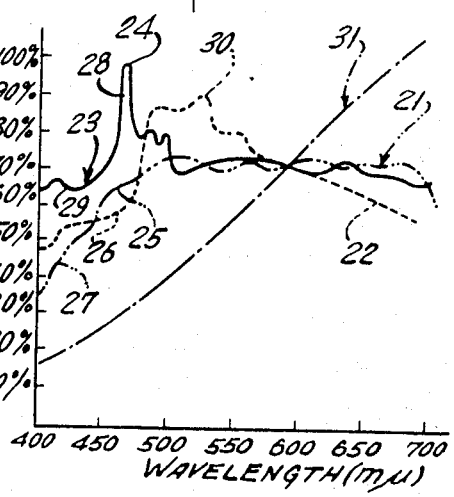
INVENTOR
HERBERT E. BRAGG
BY
ATTORNEY

United States Patent Office 3,615,161
Patented Oct. 26, 1971

3,615,161
XENON ARC PICTURE PROJECTION
Herbert E. Bragg, Oxford, N.J., assignor to
CinemaScope Products Inc., New York, N.Y.
Filed Sept. 18, 1968, Ser. No. 760,519
Int. Cl. G02b 5/28
U.S. Cl. 350—166                              5 Claims

ABSTRACT OF THE DISCLOSURE

An optical system for the projection of pictures in color where the projection is effected by the use of a xenon arc with color film having images to be projected where the color values in the film have been selected for best color appearance when projection is effected using a carbon arc as the light source. The optical system contains unique transmissive or reflective filtering means for adjusting the visual effect of each of the primary colors used in the color film when projected by the Xenon arc source. It is essential to make such adjustments to obtain the best color combination in the projection of images carried by a film selected and processed to give the best color appearance when using a carbon arc for projection.

BACKGROUND OF THE INVENTION

Field of the invention

This invention is concerned with the projection of images in color carried by a light transmissive film, particularly motion picture film. The particular field is that of presentation of motion pictures which have been so adjusted in color balance as to yield best results where the light source is a carbon arc. For various reasons, as will appear hereinafter it is sometimes desirable to utilize xenon arcs in place of carbon arcs in the projection apparatus, but so many theatres are equipped with carbon arcs, and so much of the color film has been made and continues to be made with its color balance adjusted for the best color images when the light source is a carbon arc, that it is necessary when one wishes to use a xenon arc to adjust the color balance emitted by such an arc in order to enable the existing films to be projected properly.

DESCRIPTION OF THE PRIOR ART

Besides the carbon arm which is, and for some time has been, the standard, or most commonly used light source for motion picture projection, various other light sources have been proposed and the attempt has been made to use some of them. One of these has been the mercury arc where a quartz tube filled with mercury vapor with a drop of mercury in it is made luminous by passing a current through the vaporized mercury. In some instances a plurality of these were used in various arrays. Adequate light flux was obtained but the spectral distribution was such that the blue and green regions predominated. This was deemed acceptable for black and white projection. It was unsatisfactory for the projection of colored images because the energy beam has insufficient visible red in it. Attempts have been made to correct this by the use of filters, but to do so meant filtering out so much of the light that only about one-fifth remained.

Tantalum was another product attempted for use in making arc electrodes. Its cost was too high, but it did not stand up well, and the light output was unstable. Zirconium was made into arcs by sintering and compressing the material into electrodes, but this did not produce enough luminous flux nor was it possible to produce a plasma of suitable area for the projection of motion pictures.

Mixtures of gases in high pressure capillary tubes were also attempted. Such mixtures of gases in tubes can be made to produce all the necessary colors but not enough brightness for picture projection nor, in the present state of the art, are they stable enough to give the same color balance from one use to the next or one lamp to the next. Thus, though a number of attempts have been made to improve on the carbon arc, it has, until the present, remained the standard in the Motion Picture Industry.

Though the xenon arc was recognized to have a number of advantages over the carbon arc, its utility for motion picture projection was limited by the fact that its color make-up or spectral emission characteristics were such that color films made for projection with carbon arcs appeared to have unacceptable and distorted hues. For example, the appearance of the flesh tones of the human face as adjusted in a particular film to yield attractive normal appearance when projected with a carbon arc were found to take on a very unattractive blue-gray pallor when projected with a xenon arc. The xenon arc, which is nothing more than a tube or envelope of fused quartz, having tungsten electrodes in the ends thereof and filled with xenon gas, produces higher useful flux per unit of power than does the carbon arc. The xenon lamp has also greater stability of radiant energy output than does the carbon arc. Besides that, it costs less to maintain and utilizes less power than does the carbon arc. Since, however, color film is made and the color components are selected having regard to the use of a carbon arc as the light source, the xenon arc, with its different light characteristics, could not satisfactorily be used with color pictures, and thus was not acceptable as a replacement for the carbon arc until the advent of the instant invention.

Fortunately, since along with its other advantages, the xenon arc remains stable, it provides a base to work from in adjusting the color components in the manner needed to enable xenon arcs to be used in place of carbon ones. Working from that stable base it has been found, in accordance with the invention, that filters either of the transmissive or reflective type can be made to take out exactly the right amount of light energy in exactly the right part of the spectrum, while restricting such filter to the taking out of only that requisite amount. By using such filter it is now possible to use light from a xenon arc source in an optical system to project color film which has been color compensated for light from a carbon arc. Thus, the projectionist who wishes to improve on his light characteristics, and do so with a minimum of alteration in his projection equipment, can now replace his carbon light source with a xenon arc source and a filter made in accordance with this invention, and continue to project images from the normal color films that are distributed to him.

The solution to the problem is not the simple one of just selecting available color filters such as colored glass or colored gelatin sheets to overcome the difference in hue, saturation and brightness characteristics that color pictures projected with xenon arcs present as compared to the results obtained by projecting the same film using carbon arcs for which the film was adjusted or balanced. This problem goes beyond this insertion of available filters because the characteristics of the dyes used in preparing the pictures have selective modifying effects on the light beams and these effects are different from scene to scene because the amounts of each primary dye vary. It is not enough to make the so-called apparent color temperatures of the two sources match because this visual match omits the modifying effects of the dyes used in preparing the colored images.

For an explanation of how the invention provides a solution to the problem, reference is made to the accompanying drawing and the detailed description following the same. In that drawing:

FIG. 1 is a schematic illustration of an optical system, in accordance with the invention, utilizing transmissive filters developed in accordance with the invention.

FIG. 2 shows an idealized curve and the typical curve as obtained in accordance with the invention for the transmissive filters of the invention plotted for percent transmission against wave length (shown in millimicrons).

FIG. 3 is another schematic illustration of an optical projection system utilizing reflective rather than transmissive filters.

FIG. 4 is a graph showing the curves plotted for wave lengths within the visible portion of the spectrum against relative intensity of xenon and several other light sources.

FIG. 5 is a graph showing the typical response curve of a standard human observer's eyes.

FIG. 6 is a set of reciprocals of the density curves for three primary colors and their neutral.

In the schematic showing of FIG. 1 the optical projection system depicted has a light source 1, in this instance a xenon arc, with the usual auxiliary reflector 2 directing the light back to the principal reflector 3, from which it is reflected through the lens 4, the filter 5, the lenses 6 and 7, the film strip 8 whose images are to be projected, the lens 9 and the screen 10 onto which the pictures are projected. The various lens components shown are merely for generally illustrative purposes and form no particular part of the invention other than to suggest a type of a system in which the filter and film would be employed.

The reflector 3 in this instance is intended to reflect substantially all the light directed to it, so that the same may be transmitted through the elements of the optical sysem positioned about the axis 11.

The filter, generally indicated at 5, in FIG. 1, is by no means the common optical filter made up of one or more transmissive elements of gelatin, glass or comparable material of preselected colors. The filter 5 and the development of the same being the essence of the invention, is shown in exaggerated manner in order to enhance the illustration and appreciation of the invention. In fact, the filter of the invention is a far cry from the known filters of the prior art just referred to, and is made up in quite a different manner.

Basically the filter of the invention has a transparent carrier, or base element, indicated by the thick portion 15 in FIG. 1. The material from which this is made must be highly heat resistant, have a low coefficient of expansion of which fused quartz and the glass known as "Pyrex" are examples. The reason for this is that the filtering elements are applied to the base 15 by depositing the same by evaporation on the base, or carrier, as complete layers, one on top of the other. The materials selected are of suitable high and low refractive indices, of which non-limiting examples are zinc sulfide (ZnS) for the high index, and magnesium fluoride (MgFl) for the low index, or such a combination as titanium dioxide and silicon dioxide in which combination silicon dioxide serves as the low index material of the pair.

A multitude of layers of such materials are deposited by known evaporation techniques in layer thicknesses of extreme thinness of which one-quarter of a wave length is a representative example. These layers are illustrated by the multitude of strips between the fine lines bracketed in the section marked 16 of the filter 5. The layers alternate in high and low reflective index materials though some layers may be a multiple thickness of the same material.

The application of the layers in accordance with the development illustrated by the graph of FIG. 2, is made in such a fashion as to produce a selective radiation rejection, in accordance with well known interference phenomena between thin layers as just described, of approximately 25% at a wave length of approximately 465 mu. with the rejection becoming gradually less as the wavelengths increase and decrease from the 465 mu position. This relative increase and decrease, in accordance with the findings on which the graph of FIG. 2 are based, reaches a position of substantially no rejection as the wavelengths of 440 in the decreasing direction and 510 in the increasing direction are reached.

Referring briefly to FIG. 5, the relative sensitivity of the human eye of a so-called standard observer with respect to particular wavelengths of visible light is shown by the curve 20. This had to be taken into consideration in the selection of the dyes employed in the making of color film inasmuch as the goal of color photography and the projection of color pictures is to simulate as closely as possible, insofar as the human observer is concerned, the color characteristics of the subject being photographed, as if the subject were viewed directly by the human eye. A complicating factor in this decision is the varying visual effect when light from different sources transmitted through these dyes is viewed by the observer. In other words, the dyes have selectively modifying effects on light beams. The vsual appearance from these modifying effects may differ from scene to scene, even though the so-called apparent color temperature of the two sources is made to match visually, that is to say, the visual appearance of the projected light beams without the modifying effects of the color image dyes is made to match visually.

A simplified explanation of the basis of the invention is as follows:

Consider two light projectors side by side, one equipped with a carbon arc and one equipped with a Xenon arc each projecting its own patch of light side by side on to the same white surface. The intensities or brightness of these patches can be adjusted by diaphragms, for example, so that they appear equally bright. Under this condition if the carbon arc has the spectral energy distribution shown by the curve 22 in FIG. 4 and the Xenon arc has the spectral distribution shown by the curve 23, FIG. 4, then these two patches though equally bright will have a different hue. The patch from the Xenon arc appears bluer than that from the carbon arc.

Now the ordinary well known glass or gelatin filters may be selected and inserted in the beam of the Xenon arc and a sufficient amount of blue light may be absorbed from the beam so that the patches will appear to have the same color and the diaphragms may be readjusted so that the brightness again appears identical. However, if two identical color pictures, that is identical in appearance when projected with the carbon arc, are inserted one in each beam, and are projected side by side, these color pictures will not in general appear alike. This is because, until the present invention, the inserted color corrective filter did not remove the proper wavelengths from the light from the Xenon arc. This is illusrated by the curves shown in FIG. 6.

In FIG. 6 are shown the reciprocals of the curves for the dye primaries used in present day color processes. One is shown in the dash line A, the next in dot-dash line B, and the third in dotted line C. Their neutral is shown in the line or curve D. These curves show characteristics of the dye primaries that have to be taken into consideration in the make up of color film prepared for projection using a carbon arc as a light source as indicated in the simplified analysis above. Inasmuch, however, as the quantity of each dye primary may be different from scene to scene the magnitude of the effect may be different when a Xenon light source is interposed in place of a carbon arc. This must be taken into consideration in developing the necessary filter to be used in the light produced from a Xenon source.

For a further appreciation of the relative wave length emissions of visible light from several sources, reference is made to FIG. 4. Here light from the sun is shown by the dash and double dot line 21, that from a carbon arc is shown by the dotted line 22, that from a Xenon arc is shown by the solid line 23, and that from a tungsten incandescent lamp is shown by the dot dash line 31. Here the rather marked difference and predominance of blues above wavelength 465 in the Xenon source is shown by the peak 24 as against the opposed value 25 of the sun and the carbon arc value at 26. Then the light from the sun drops off rather rapidly towards the shortest wavelength part of the visual spectrum as seen at 27, while the light from the Xenon source, though still well above the intensity of the carbon arc light, drops off sharply at 28 and flattens out at 29 without dropping in intensity in the shorter visible wavelengths to anything like the extent of the light from the carbon arc or the sun.

In the direction of increasing wavelength, the intensity of the light from the Xenon arc is well above sunlight and further above light from the carbon arc from the peak 24 until about the position where the 500 wavelength mark is reached. From this position, indicated at 30, there occur peaks of radiation in the carbon arc as used in the motion picture industry. Light intensity from the three sources in the wavelengths toward the longer wave length end of the visible spectrum more or less run along together. Light from an incandescent tungsten source as indicated by the curve 31 exhibits quite different characteristics.

As is apparent from the showing in FIG. 4, one of the most apparent characteristics of light from the Xenon arc is its high intensity of blue light at approximately the wavelength 465. In this spectral region, under normal conditions of pressure and temperature at which Xenon arcs are operated, there is a relatively narrow band of intense blue light which is in excess of that required to project a film in its proper balance when the film was originally adjusted for carbon arc projection. This pronounced intensity area of the spectrum must be compensated for in short order to enable Xenon arcs to be used for projection of such films.

An idealized curve, based upon the computational analysis, needed to adjust light from a Xenon arc source for the projection of film adjusted for carbon arc projection is shown at 34 in FIG. 2. Here the maximum reduction of the blue component needed is shown at the position 35. The need for adjustment drops off sharply as the above wavelength decreases, as shown at 36, with a somewhat less abrupt sharp drop off between the positions 35 and 37 in the longer wavelength direction. From there a more gradual drop off takes place to the position 38.

Adjustment is made as herein before outlined through a multitude of filter elements, the thickness and arrangement of which can be calculated though not without considerable difficulty, by working from increments along the length of the curve 34 of FIG. 2. Fortunately, however, computers are now available into which the factors can be fed to produce results in the form of type and number of filter layers, as shown at 16, to filter the transmitted light coming from the Xenon arc source 1 in order to render that light entirely satisfactorily for the projection of images on the color film 8 as if a carbon arc for which the film was intended were employed. Curve 39 in FIG. 2 illustrates the actual results obtained in the make up of the filter as compared with the idealized curve 34. This very close approximation to the ideal proves to be eminently satisfactory.

As previously explained to some extent, the filter is made, after the requirements for it are determined, by placing the carrier, or base element 15, in a vacuum chamber and mounting it above a tray of material to be evaporated. The pressure within the chamber is then reduced and the tray is heated so that the material to be evaporated first, in accordance with the results of the calculations, is applied by evaporation to the carrier in a layer of one-quarter wavelength, or such other controlled thickness as may be desired. Once this layer has been applied, then the process is repeated with another material of different refractive index of the computed thickness, and this procedure is followed alternately using high and low refractive index materials in such a fashion as to produce, by the aforementioned well known interference phenomena, a selective radiation rejection of approximately 25% at a wavelength of approximately 465 mu. The layers provide gradually less rejection of each wavelength above and below 465 mu until substantially no rejection occurs at wavelengths of 440 mu and 510 mu as is seen from the curve 39 in FIG. 2.

As a specific example in accordance with the showing of FIG. 1, to the surface of a transparent carrier or base element 15 of "Pyrex" glass alternate layers of zinc sulfide and magnesium fluoride were applied in layers of one-quarter wave length thickness by evaporation in a vacuum chamber. A multitude 16 of such layers was applied until a filter was formed which will reject, or reflect, 25% of the radiation at a wave length of approximately 465 mu as shown in the graph of FIG. 2.

As an alternative to the example just given at a selected position in the multitude of layers 16 more than one layer of one of the materials was applied on top of a layer of the same material without interposing a layer of the other material therebetween.

As an example in accordance with the showing of FIG. 1, a base element 15 of fused quartz had a multitude 16 of layers of titanium dioxide and silicon dioxide applied alternately thereto by evaporation in a vacuum, with such layers being of a thickness of one-quarter wave length until sufficient layers were built up to reject, or reflect, approximately 25% of the radiation at the wave length of approximately 465 mu, as seen by the graph of FIG. 2.

A an example in keeping with the FIG. 3 showing, a reflector, as seen at 43 was made up with a base 46 of Pyrex glass having layers 45 applied thereto in the manner set out and of the type referred to at 16 in the first example given above. The difference here is that the approximately 25% excess blue light rejected passed out through the back 46 of the reflector rather than being reflected from it.

In FIG. 3 an optical system employing a xenon arc light source 41 is shown where a reflector 42 is employed the same as the reflector 2 of FIG. 1, but, instead of having a transmissive filter with layers applied to a transparent carrier, the filtering is effected by means of the reflector 43. Here the face surface of the reflector 43 towards the light surface 31, as seen at 44, forms the carrier for series of reflecting filters 45. These filters, whose arrangement is determined in the same general manner as the filters in the assembly 16 of FIG. 1, act differently however, in that they permit the excess blue light in the portions of the curve of FIG. 2, such as 34, 35, 36 to pass through the back 46 of the reflector rather than being reflected from it. The remainder of the light, that is the light suitable for the projection of images from a color film adjusted for projection by use of a carbon arc, are reflected by the reflector 43 and pass through the lenses, such as 47, 48, and 49, before being transmitted through the color film 50 and the lens 51 to be imaged on the screen 52.

From the foregoing description with reference to the accompanying drawing it will be seen that the invention enables entirely satisfactory projection of color images to be effected by the use of a xenon arc light source though the color values of the images have been selected for best color appearance when projected using a carbon arc as the light source. The adjustment of the visual effect enabling the use of a xenon arc light source in accordance with the invention is achieved in a manner enabling the conversion of projection equipment for use of a xenon arc to be effected simply and economically. Two manners of achieving this adjustment have been disclosed, but, it is appreciated that other embodiments of the invention may well suggest themselves to those skilled in the art without departing from the spirit and scope of the invention. Furthermore, it is intended that all material contained in the above description or shown in the accompanying drawing shall be interpreted as illustrative and not in a limiting sense.

Having described my invention what I claim as new and desire to secure by Letters Patent is:

1. A filter for adjusting the color values of light from a xenon arc light source to enable the projection of satisfactory color values in a picture projected by light from such source transmitted through a color film having its colors adjusted for projection using a carbon arc light source, which comprises, a base of highly heat resistant low coefficient of expansion transparent material of substantial thickness and a multiplicity of fine alternating layers of material of different indices of refraction forming sets carried on one face of said base, one of said sets of layers being made up of material of a high index of refraction and the other of said sets being made up of material of a low index of refraction, said layers each being of approximately one-quarter of a wave length in thickness for filtering out excess blue light in a narrow band including said wave length, in which band the intensity of light from the xenon arc light source substantially exceeds that of the carbon arc light source.

2. A filter as in claim 1, said material of a high index of refraction consisting of one of zinc sulfide and titanium dioxide and said material of low index of refraction consisting of one of magnesium fluoride and silicon dioxide.

3. A filter as in claim 1, said multiplicity of layers rejecting radiation selectively on an interference basis with approximately 25% of the radiation from a xenon arc source being rejected at a wave length of approximately 465 mu.

4. A filter as in claim 3, said layers rejecting less radiation as the wave lengths increase and decrease from 465 mu.

5. A filter as in claim 1, said base being a reflector with approximately 25% of the light from a xenon arc source at a wave length of approximately 465 mu passing through the base of said reflector while the remainder of the light from said source is reflected from said base.

References Cited

UNITED STATES PATENTS 3,185,834   5/1965   Thelen et al. _____ 350—166 X

FOREIGN PATENTS 608,225   9/1948   Great Britain _____ 350—166

OTHER REFERENCES

Koch, G. J., "Interference Mirrors for Arc Projectors," Projectionist, vol. 25, No. 11, November 1950, pp. 12 and 15.

Baumeister, P. W., Notes on Multilayer Optical Filters, MIL–HDBK–140—Institute of Optics, Rochester, N.Y., rcvd. Apr. 13, 1964, pp. 20–16.

DAVID SCHONBERG, Primary Examiner

T. H. KUSMER, Assistant Examiner

U.S. Cl. X.R.

350—311